US007047220B2

(12) United States Patent
Taguchi et al.

(10) Patent No.: US 7,047,220 B2
(45) Date of Patent: May 16, 2006

(54) PRODUCT TRADING SYSTEM, PRODUCT TRADING METHOD, AND COMPUTER PROGRAM AND RECORDING MEDIUM FOR PERFORMING THE METHOD

(75) Inventors: Akihito Taguchi, Tokyo (JP); Norio Shirai, Tokyo (JP); Tadaharu Ishii, Tokyo (JP)

(73) Assignee: Komatsu Ltd., Tokyo (JP)

( * ) Notice: Subject to any disclaimer, the term of this patent is extended or adjusted under 35 U.S.C. 154(b) by 697 days.

(21) Appl. No.: 10/026,824

(22) Filed: Dec. 27, 2001

(65) Prior Publication Data

US 2002/0087459 A1 Jul. 4, 2002

(30) Foreign Application Priority Data

Dec. 28, 2000 (JP) ............................. 2000-401164

(51) Int. Cl.
*G06Q 40/00* (2006.01)
(52) U.S. Cl. .......................................... 705/37; 705/26
(58) Field of Classification Search ................. 705/26, 705/37, 400, 8; 700/95, 107
See application file for complete search history.

(56) References Cited

U.S. PATENT DOCUMENTS

| | | | | |
|---|---|---|---|---|
| 5,630,070 A | * | 5/1997 | Dietrich et al. ................. | 705/8 |
| 5,787,000 A | * | 7/1998 | Lilly et al. ..................... | 700/95 |
| 5,940,807 A | * | 8/1999 | Purcell ......................... | 705/26 |
| 6,041,267 A | * | 3/2000 | Dangat et al. ............... | 700/107 |
| 6,049,742 A | * | 4/2000 | Milne et al. ..................... | 705/8 |
| 6,219,653 B1 | * | 4/2001 | O'Neill et al. .............. | 705/400 |
| 2002/0026403 A1 | * | 2/2002 | Tambay et al. ............... | 705/37 |

FOREIGN PATENT DOCUMENTS

GB 2372338 A * 8/2002

OTHER PUBLICATIONS

Mukhopadhyay, Samar, "Optimal Scheduling of Just-in-Time Purchase Deliveries", International Journal Of Operations & Production Management, vol. 15, No. 9, pp. 56-69, 1995.*

* cited by examiner

*Primary Examiner*—Salvatore Cangialosi
(74) *Attorney, Agent, or Firm*—Westerman, Hattori, Daniels & Adrian, LLP.

(57) ABSTRACT

A product trading system has a production information accumulating means for accumulating production information of a product produced by each of mobile production machines under the seller's administration, a demand information accepting means for accepting demand information about the product which the seller would like to purchase, a matching processing means for performing a matching processing that derives optimal production information from the production information being accumulated in the production information accumulation means in consideration of freight cost based on the demand information accepted at the demand information accepting means, and a matching processing result presentation means for representing the buyer the processing results from the matching processing means.

16 Claims, 13 Drawing Sheets

F I G. 4

PRODUCTION INFORMATION DATABASE 31

| MACHINE NO. | SELLER | POSITIONAL INFORMATION | | PRODUCT ITEM | QUALITY | DELIVERY DATE | AMOUNT OF PRODUCTION m³ | UNIT PRICE OF ITEM ¥/m³ |
|---|---|---|---|---|---|---|---|---|
| | | LATITUDE | LONGITUDE | | | | | |
| A0001 | FIRM "A" | N35/41/05 | E139/40/11 | RECONSTRUCTED MACADAM | C40 | 00/12/01 | 3000 | 600 |
| A0002 | FIRM "A" | N35/38/10 | E137/35/15 | RECONSTRUCTED MACADAM | C40 | 00/11/25 | 4000 | 500 |
| B0001 | FIRM "B" | N35/37/13 | E135/44/30 | WOODEN TIP | △△ | 00/11/15 | 2000 | 600 |
| ⋮ | ⋮ | ⋮ | ⋮ | ⋮ | ⋮ | ⋮ | ⋮ | ⋮ |

FIG. 5

DEMAND INFORMATION DATABASE 32

| SELLER | DESIRED PURCHASE ITEM | DESIRED QUALITY | SUGGESTED DELIVERY DATE | DELIVERY PLACE | AMOUNT OF PURCHASE m3 |
|---|---|---|---|---|---|
| FIRM "C" | RECONSTRUCTED MACADAM | C40 | 00/12/01 | ○○ CITY ○○ WORKSHOP | 3000 |
| FIRM "D" | WOODEN TIP | △△ | 00/11/25 | △△ CITY △△ FACTORY | 4000 |
| FIRM "E" | LANDFILL MATERIAL | ○○ | 00/11/15 | □□ CITY □□ WORKSHOP | 2000 |
| ... | ... | ... | ... | ... | ... |
| ... | ... | ... | ... | ... | ... |
| ... | ... | ... | ... | ... | ... |

FIG.6

EVALUATION INFORMATION DATABASE (33)

| INFOR-MATION ADDRESSER | SELLER/ BUYER | TRADING PARTNER | TRADING SUBJECT | QUALITY | AMOUNT OF PURCHASE m3 | EVALUATION INFORMATION | | | |
|---|---|---|---|---|---|---|---|---|---|
| | | | | | | EVDELIVERY DATA | QUALITY | PRICE | ... |
| FIRM "A" | SELLER | FIRM "C" | RECON-STRUCTED MACADAM | C40 | 3000 | ○ | △ | ○ | ... |
| FIRM "B" | SELLER | FIRM "D" | WOODEN TIP | △△ | 2000 | △ | ○ | ○ | ... |
| FIRM "C" | BUYER | FIRM "A" | RECON-STRUCTED MACADAM | C40 | 4000 | ○ | ○ | ○ | ... |
| ... | ... | ... | ... | ... | | ... | ... | ... | ... |
| ... | ... | ... | ... | ... | | ... | ... | ... | ... |
| ... | ... | ... | ... | ... | | ... | ... | ... | ... |

FIG. 12

PRODUCT SEARCH SCREEN (MEMBERS SCREEN)

SEARCH CONDITION

| SWITCH THE DISPLAY SCREEN | TRADING CATEGORY | SALES INFORMATION ▽ | DISPLAY METHOD | TEXT ▽ | | | START SEARCH |
|---|---|---|---|---|---|---|---|
| REFINE THE SELECTIVE CONDITIONS | ITEM | RECONSTRUCTED MACADAM ▽ | PRICE | SORT BY CHEAPNESS ▽ | DATE | FROM OCT. 5 TO OCT. 13 | CLEAR DISPLAY |
| | QUALITY/SIZE | RC40 ▽ | SITE | SORT BY NEARNESS ▽ | AMOUNT | 2,000 m3 | |

SEARCH RESULTS — G32

| SELECT | NO | ITEM | QUALITY/SIZE | TOTAL UNIT PRICE/m3 | UNIT PRICE OF ITEM | FREIGHT COST | DISTANCE | AMOUNT | TOTAL COST | SITE | DATE |
|---|---|---|---|---|---|---|---|---|---|---|---|
| ☑ | 1 | REC.MAC | RC40 | ¥160/m3 | ¥600/m3 | ¥100/km·m3 | 10km | 100m3 | 160,000 | C SITE | 2000/10/8 |
| ☐ | 2 | REC.MAC | RC40 | ¥160/m3 | ¥600/m3 | ¥100/km·m3 | 10km | 100m3 | 160,000 | C SITE | 2000/10/9 |
| ☑ | 3 | REC.MAC | RC40 | ¥160/m3 | ¥600/m3 | ¥100/km·m3 | 10km | 100m3 | 160,000 | C SITE | 2000/10/10 |
| ☐ | 4 | REC.MAC | RC40 | ¥160/m3 | ¥600/m3 | ¥100/km·m3 | 10km | 200m3 | 320,000 | C SITE | 2000/10/11 |
| ☑ | 5 | REC.MAC | RC40 | ¥160/m3 | ¥600/m3 | ¥100/km·m3 | 10km | 200m3 | 320,000 | C SITE | 2000/10/12 |
| ☑ | 6 | REC.MAC | RC40 | ¥160/m3 | ¥600/m3 | ¥100/km·m3 | 10km | 200m3 | 320,000 | C SITE | 2000/10/13 |
| ☐ | 7 | REC.MAC | RC40 | ¥200/m3 | ¥500/m3 | ¥100/km·m3 | 15km | 200m3 | 400,000 | A SITE | 2000/10/5 |
| ☑ | 8 | REC.MAC | RC40 | ¥200/m3 | ¥500/m3 | ¥100/km·m3 | 15km | 200m3 | 400,000 | A SITE | 2000/10/6 |
| ☐ | 9 | REC.MAC | RC40 | ¥200/m3 | ¥500/m3 | ¥100/km·m3 | 15km | 200m3 | 400,000 | A SITE | 2000/10/7 |
| ☐ | 10 | REC.MAC | RC40 | ¥200/m3 | ¥500/m3 | ¥100/km·m3 | 15km | 200m3 | 400,000 | A SITE | 2000/10/8 |

SELECTED TOTAL

| NO | DATE | AMOUNT | SUM AMOUNT | COST | SUM COST |
|---|---|---|---|---|---|
| 1 | 2000/10/5 | 200 | 200 | 400,000 | 400000 |
| 3 | 2000/10/7 | 200 | 400 | 400,000 | 800,000 |
| 6 | 2000/10/11 | 200 | 600 | 320,000 | 1,120,000 |
| 8 | 2000/10/13 | 200 | 800 | 320,000 | 1,440,000 |

| TOTAL | SUM AMOUNT | AVERAGE COST | SUM COST |
|---|---|---|---|
| | 800 | 360,000 | 1,440,000 |

PROVISIONAL ORDER    CLOSE

PRODUCT TRADING SYSTEM, PRODUCT TRADING METHOD, AND COMPUTER PROGRAM AND RECORDING MEDIUM FOR PERFORMING THE METHOD

BACKGROUND OF THE INVENTION

1. Field of the Invention

The present invention relates to a product trading system for achieving a deal between the seller who sells products and the buyer who purchases and consumes these products, a method for trading the products, and a computer program for performing the method, and a computer-readable recording medium for storing the program, which can be used as, for example, a recyclable product trading system in which scrap and waste materials to be produced in construction work or the like is processed into recyclable products to be provided to the buyer who would like to have the products.

2. Description of Related Art

In recent years, from a viewpoint of saving resources, it has been demanded to process scrap and waste materials produced by works in a construction site into recyclable products and to use such products as reusable ones. For example, earth and sand and natural stones which are produced in the tunnel digging or the like in road construction works may be converted into landfill materials or aggregates, waste woods to be produced in demolition construction of a building may be crushed and tipped such that they are converted into compost or manure materials or the like for agriculture, avoiding additional collection of earth and felling of woods. Therefore, there is an advantage that it allows an effective use of restricted resources without destroying the natural environment.

For this reason, mobile production machines such as self-propelled scrapers or self-propelled soil conditioning machines have been placed on construction sites and demolition construction sites to immediately process scrap and waste materials caused in the works into reusable products followed by transferring them to any place that desires such products, such as other construction site or a fanning plant, by a transportation means such as a track. Thus, they can be used as recyclable products.

However, the recyclable products made of waste materials caused in the construction sits have disadvantages in which their freight costs may tend to be high in spite of its comparatively cheap price per unit amount of the products. Therefore, if the products should be transferred far away with a transportation means, there is a problem that promotion of utilization of the recyclable products cannot be aimed at because of their costs higher than the prices of ones which can be commercially available in general.

Moreover, even if it is going to be used for other agricultural uses or the like, the recyclable products produced by construction work or the like, building the market between both types of industry is not always an easy task, so that it is difficult to aim at use promotion of recyclable products like the above.

Such a problem is not limited to the recyclable products. As compared with the price per unit amount of products, the same problem may be occurred in the case of making deals between the seller and the buyer with respect to the products with which freight cost increases.

SUMMARY OF THE INVENTION

A subject of the present invention is to provide a product trading system, a method for trading the products, and a computer program for performing the method, and a computer-readable recording medium for storing the program, for allowing the seller to efficiently sell the products according to the production situation thereof while allowing the buyer to get the products at optimal cost at the time of achieving a deal between the seller who sells products and the buyer who purchases such products.

In the first aspect of the present invention, a product trading system for achieving a deal between the seller who sells products and the buyer who purchases such products, comprises: a production information accumulation means for accumulating production information about products being produced or to be produced from now on by the seller; a demand information accepting means for accepting the demand information with respect to the products with which the buyer would like to purchase; a matching processing means for performing a matching processing that derives optimal production information from the production information being accumulated in the production information accumulation means in consideration of freight cost based on the demand information accepted at the demand information accepting means; and a matching processing result presentation means for representing the buyer the processing results from the matching processing means.

Here, the term "a product" or "products" mainly means that one or one of those having comparatively cheap price per unit amount of construction aggregate, landfill material, wood tip, or the like and comparatively high freight cost because of selling and buying in large quantities. The freight cost is not prescribed by only the geographical distance between delivery places: a place where the seller makes the products and a place where the buyer demands to take delivery of the products from the seller. But also it is grasped as overall cost in consideration of the kind of transportation means, such as a track, a vessel, a railroad, and an aircraft.

In this invention, production information provided from the seller is accumulated in the production information accumulating means. Then, the optimal production information taken into consideration in freight cost is extracted from the accumulated production information by the matching processing means on the basis of the information about the buyer's demands being accepted by the demand information accepting means, followed by showing the buyer the optimal production information on the matching processing result presentation means.

Therefore, the buyer is allowed to purchase the desired product at the optimal cost. On the other hand, the seller is allowed to sell the product efficiently depending on the situation of producing the product as the seller deals the product without separately performing any promotion or the like to the buyer.

In the product trading system of the present invention, if the production information includes items, quality, quantity of production, unit price, shipping time, and production place of the product to be produced, and also the demand information includes items, the amount of purchase, delivery time, and delivery place of the product with which the buyer would like to purchase, it is desirable to have the followings. That is, the matching processing means comprises: a production information refining part that considers the items, quality, and delivery time of the products included in the demand information as fixed items and refines the production information that suits the fixed items; a price calculation part for computing a price that contains freight cost; a rank setting part for setting up the rank of each production information in increasing order of price on the base of prices calculated in the price calculation part; and a purchase amount decision part for selecting the production information in increasing order of price on the basis of the rank set up in the rank setting part and deciding whether the amount of purchase of the products in the selected information fills the amount of purchase in the demand information.

Here, the "items" contained in the fixed items means the kinds of products, such as a reproduction macadam used as aggregate for concretes, a landfill material, and a piece of wood tip, the "quality" means the grade of these products specified by JIS (Japanese Industrial Standard) or the like, and the "delivery time" means the time when the buyer uses products.

Even if it is the case where the product trading system simultaneously manages two or more products such as landfill materials, construction aggregates, wood tips, or the like, the product information refining part allows that an object of the matching processing only includes the information corresponding to the desired items, quality, and delivery time of the products to be purchased by the buyer.

For each information being refined, the product price including a freight cost can be calculated by the price setting part, and then the rank setting part sets the rank of production information in increasing order of price, allowing the selection of the production information for the cheapest price including a freight cost.

Furthermore, even if the amount of purchase which is desired by the buyer is not satisfied by selecting one piece of production information, the purchase amount decision part selects another piece of the production information for the next cheap price. Such a selection can be repeated until the desired amount of purchase is satisfied, so that the buyer is able purchase the desired amount of the products at optimal price.

In the product trading system of the present invention, it is preferable that each of the product trading systems described above may comprise a demand information accumulating means for accumulating demand information being accepted by the demand information accepting means and a demand information presentation means for showing the seller the demand information being accumulated in the demand information accumulating means.

Here, the demand information to be represented to the seller by the demand information presentation means may include the item, quality, desired delivery time, and the like of the desired product to be purchased. As the demand information, for example, the seller may be shown that that the item is reproduction macadam, the quality (size) of the product is RC40, the desired date for delivery is for example "day xx: month xx: year xxx" so that the seller will become possible to form a production plan to produce the macadam of RC40 by the delivery time.

According to the present invention, the products desired by the buyer can be produced so as to promote the trading of products as the seller can grasp of what products the buyer would like to purchase beforehand.

In the product trading system of the present invention, each of the product trading systems described above may comprise an evaluation information accepting means for receiving the information about evaluations made by the trading partner, which is provided from the seller and/or the buyer after attaining a deal between the seller and the buyer; and an evaluation information accumulating means for accumulating evaluation information received by the evaluation information accepting means.

According to the present invention, therefore, it becomes possible to accumulate the evaluations made by the seller and/or the buyer with respect to the about actual trading attained between them by the evaluation information accepting means and the evaluation information accumulating means. Therefore, a system administrator can eliminate the seller who delivers poor quality products or the buyer who does not pay the charge after purchase from the trading system to maintain the sound product trading.

In the product trading system of the present invention, it is desirable to be constructed as a client/server system where a seller terminal, a buyer terminal, and a server are connected together through a network. In addition, the production information accumulating means, the demand information accepting means, a matching processing means, and the matching processing result presentation means may be placed in the server.

Here, as for the network, it is desirable to adopt one based on general-purpose protocols such as TCP/IP, i.e., including the Internet.

According to the present invention, therefore, the main part of the system is integrated in the server, so that the production information, the demand information, and so on can be collectively managed on the database to be built on the server, facilitating the management of the system.

Moreover, the system can be used only by installing general-purpose browser software in each of the seller and buyer terminals, so that both the seller and the buyer can participate in the system easily. Furthermore, the seller and the buyer can participate in the system using their own general-purpose personal computers, respectively. Therefore, any participant can be facilitated to participate in the system.

In a second aspect of the present invention, a product trading system for achieving a deal between a seller who sells a product produced by a mobile production machine and a buyer who purchases the product, comprises:

a machine information output means for generating an output of machine information that includes items of the product produced by the machine, positional information about the machine, and operational information;

a production information accumulating means for accumulating production information about the product based on the machine information outputted from the machine information output means;

a demand information accepting means for accepting demand information about the product which the seller would like to purchase;

a production information extracting means for extracting the machine information being accumulated in the production information accumulating means based on the demand information being accepted by the demand information accepting means; and a production information presentation means for showing the buyer the mobile production machine located in the neighborhood of the delivery place included in the demand information among the production information extracted with the production information extracting means.

Here, the mobile production machine may be a machine that processes construction waste materials into reusable products, such as a self-propelled scraper or a self-propelled soil conditioning machine to be placed on a construction site or the like, or may be an excavator or the like that excavates the ground or the like to produce earth and sand, such as a bulldozer or a foil loader.

In addition, a machine information output means is mounted on the mobile machine to output various kinds of information about the mobile machine, such as location information, movement information, and operation information. Preferably, the machine information output means adopts an information transmission device that sends out the information by wireless.

According to the present invention, the production information based on the machine information of the mobile production machine outputted from the machine information output means is accumulated in the production information accumulating means. Therefore, the production information extracting means extracts the production information to be fit to the demand information with respect the product being desired by the buyer and then the production information shows the buyer the production information located in the neighborhood of the delivery place where the buyer requests to deliver the production.

Therefore, the buyer is able to purchase the product from the near site, lowering the freight cost. Thus, the product can be obtained at the optimum cost.

Moreover, the seller is able to sell the product to the buyer living in the neighborhood, so that the products can be efficiently sold depending on the production conditions.

In the product trading system of the preceding aspect, it is preferable to further comprise a matching processing system for performing a matching processing in consideration of freight cost.

According to the present invention, therefore, in addition to the actions and effects, which are described above for the preceding aspect, the following actions and effects can be obtained.

That is, the production information outputted from the seller is accumulated in the production information accumulating means, followed by extracting the optimal information taken into consideration in freight cost from the accumulated production information on the basis of the demand information of the buyer accepted by the demand information accepting means.

Therefore, the buyer can purchase the desired products at the optimal cost. On the other hand, the seller sells the products efficiently depending on the production conditions thereof as the seller attains a deal with the buyer without separately performing promotion or the like.

In particular, the seller is able to attain a deal with the buyer according the position of the seller's mobile production machine, so that the convenience of trading can be further improved.

In addition, the product trading system of the preceding aspect, the details of each element can be applicable. Thus, the actions and the effects explained with each element can be obtained.

The product trading system of the present invention described above can be developed as the products trading method as a third aspect of the present invention.

According to the products trading method of the present invention, the same effects as those of the invention claimed in claims 1 to 4 can be obtainable.

Furthermore, in a fourth aspect of the invention, each of the products trading method can be performed as a computer program to be executed by a computer.

Moreover, in a fifth aspect of the invention, the computer program is stored in a computer-readable recording medium.

According to the present invention, therefore, the program can be installed in the general-purpose server to be used in the Internet or the like to allow the execution of the products trading method according to the present invention, facilitating the utilization of the products trading method of the invention.

BRIEF DESCRIPTION OF THE DRAWINGS

FIG. 4 is a schematic diagram that illustrates a data structure of the production information accumulating means in the embodiment shown in FIG. 1;

FIG. 5 is a schematic diagram that illustrates a data structure of the demand information accumulating means in the embodiment shown in FIG. 1;

FIG. 6 is a schematic diagram that illustrates a data structure of the evaluation information accumulating means in the embodiment shown in FIG. 1;

FIG. 12 is a schematic diagram that illustrates a display screen represented by the matching processing result presentation means in the embodiment shown in FIG. 1.

DETAILED DESCRIPTION OF THE PREFERRED EMBODIMENTS

Hereinafter, we will describe preferred embodiments of the present invention with reference to the attached drawings.

[System Configuration]

Figure 1:
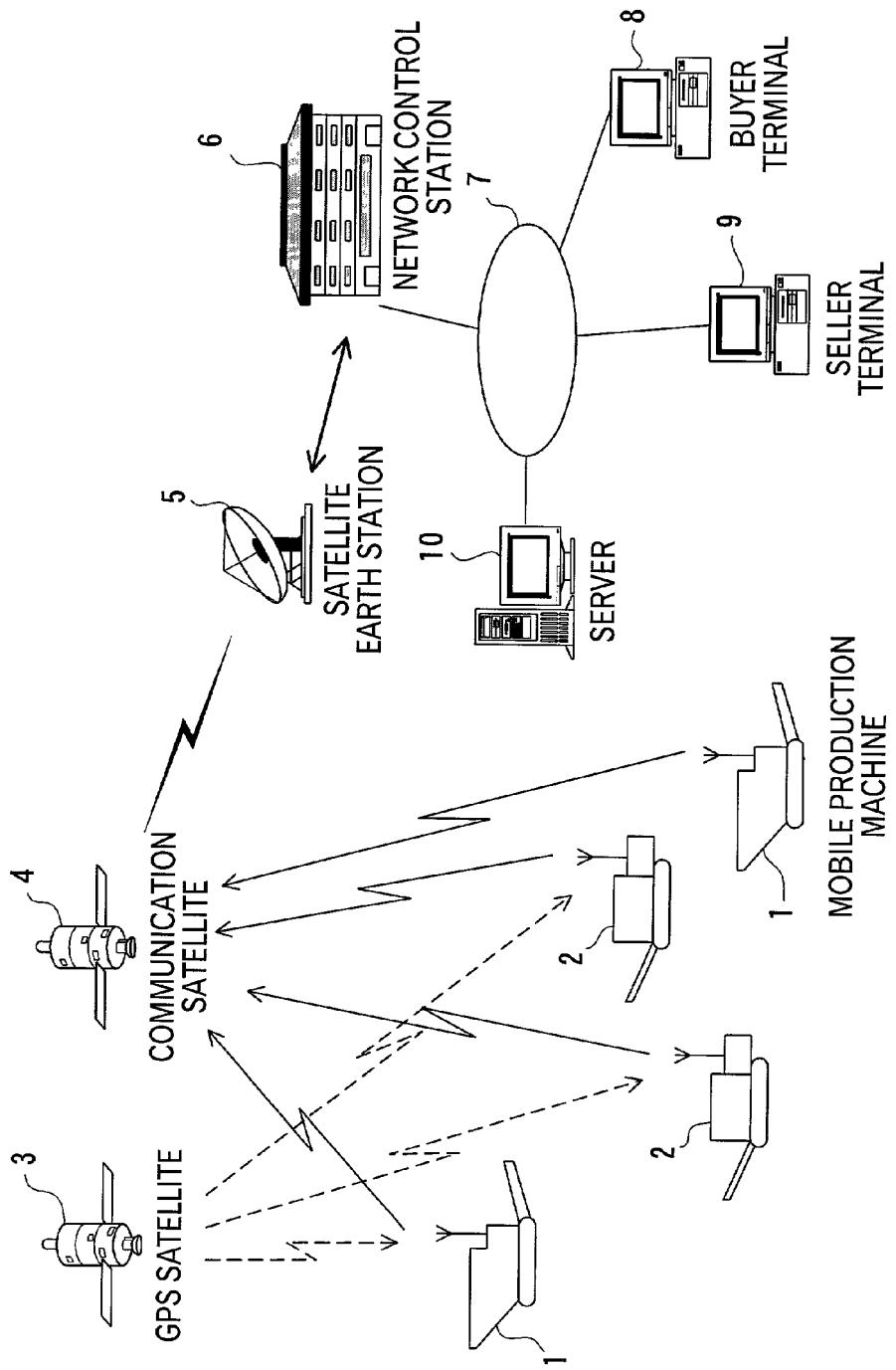
FIG. 1 is a schematic diagram that illustrates the configuration of the product trading system as one of the preferred embodiments of the present invention.

FIG. 1 shows a schematic diagram that illustrates the general configuration of a product trading system as one of the preferred embodiments of the present invention. The product trading system comprises: two or more mobile production machines 1, 2; a global positioning system (GPS) satellite 3; a communication satellite 4; a satellite earth station 5; a network control station 6; a network 7; a buyer terminal 8; a seller terminal 9; and a server 10. Product information including positional information and operational information to be generated from the mobile machines 1, 2 can be accumulated in the server 10. A buyer is able to access the server 10 using the buyer terminal 8 to achieve a deal of products between the seller and the buyer.

Each of the mobile production machines 1, 2 is a machine for processing waste materials generated during the construction work or demolition construction into recyclable products, which can be installed in the construction site for a road or the like or the demolition construction site. Such a machine may be a self-propelled scraper 1 on which a joke crusher or an impact crusher is mounted, or may be a self-propelled wood crusher 2 on which a hammer mil is mounted.

Figure 2:
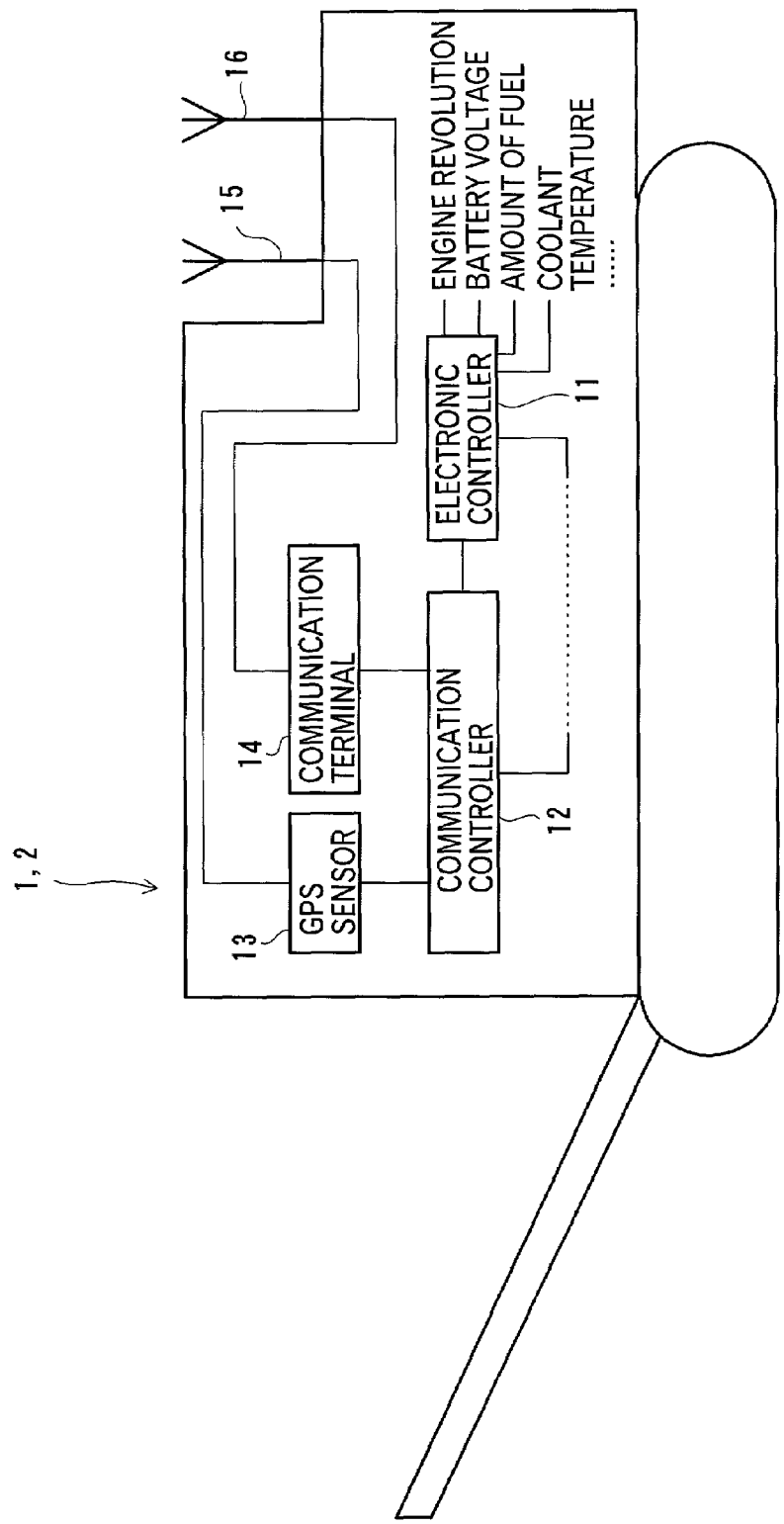
FIG. 2 is a block diagram that illustrates the configuration of the machine information output means mounted on the mobile production machine provided as one of components that make up the system of the embodiment shown in FIG. 1.

As shown in FIG. 2, each of the mobile production machines 1, 2 comprises: an electronic controller 11 for electronically controlling a driving part; a communication controller 12 connected to the electronic controller 11; a GPS sensor 13 and a communication terminal 14 connected to the communication controller 12; a GPS antenna connected to the GBS sensor 13; and a satellite communications antenna connected to the communication terminal 14.

The electronic controller 11 receives signals from sensors that detect the states of factors for driving mobile production machines 1, 2 and electronically controls these factors in response to the signals. In this case, the factors include an engine revolution, a battery voltage, an amount of fuel, a coolant temperature, a service meter, an operation time, and so on.

The communication controller 12 is a part for obtaining the operational information of the mobile production machines 1, 2 from the conditions of the mobile production machines 1, 2 of each driving part detected by the electronic controller 11. Specifically, the communication controller 12 is allowed to obtain the operational and production information of the mobile production machines 1, 2 on the basis of the drive time for driving a crusher of the mobile production machines 1, 2 or a hammer mil. In addition, not shown in FIG. 2, the communication controller 12 has a storage area inside. The storage area stores information such as one about owners and total operational times of the mobile production machines 1, 2.

The GPS sensor 13 receives the electric waves outputted from two or more GPS satellite 3 and measures its own present position on the basis of the conditions of electric waves being received from two or more GPS satellites 3. The present position information of each of the mobile production machines 1, 2 obtained by the GPS censor can be outputted to the communication controller 12.

The operational information and the positional information of each of the mobile production machines 1, 2 obtained by the communication controller 12 are outputted from the satellite communications antenna 16 through the communication terminal 14 and are then accumulated as production information of each of the mobile production machines 1, 2 in the server 10 after transmitting through the communication satellite 4, the satellite earth station 5, and the network control station 6, and the network 7. Thus, the communication controller 12 and the communication terminal make up the machine information output means in the present invention.

The network 7 is constituted as the Internet based on general-purpose protocols, such as TCP/IP, and the buyer terminal 8 which the buyer owns, and the seller terminal 9 which the seller owns are connected to this network 7.

Each of the buyer and seller terminals 8, 9 are a general-purpose computer comprised of: the main part thereof which consists of a central processing unit (CPU) and a storage device; input devices such as a keyboard and a mouse to be connected to the main part; and a display device such as a display. A browser software is installed in the computer for accessing a web site or the like on the Internet is installed in such a computer. Therefore, the buyer and the seller secure access with the server 10 mentioned later by starting this browser software.

Figure 3:
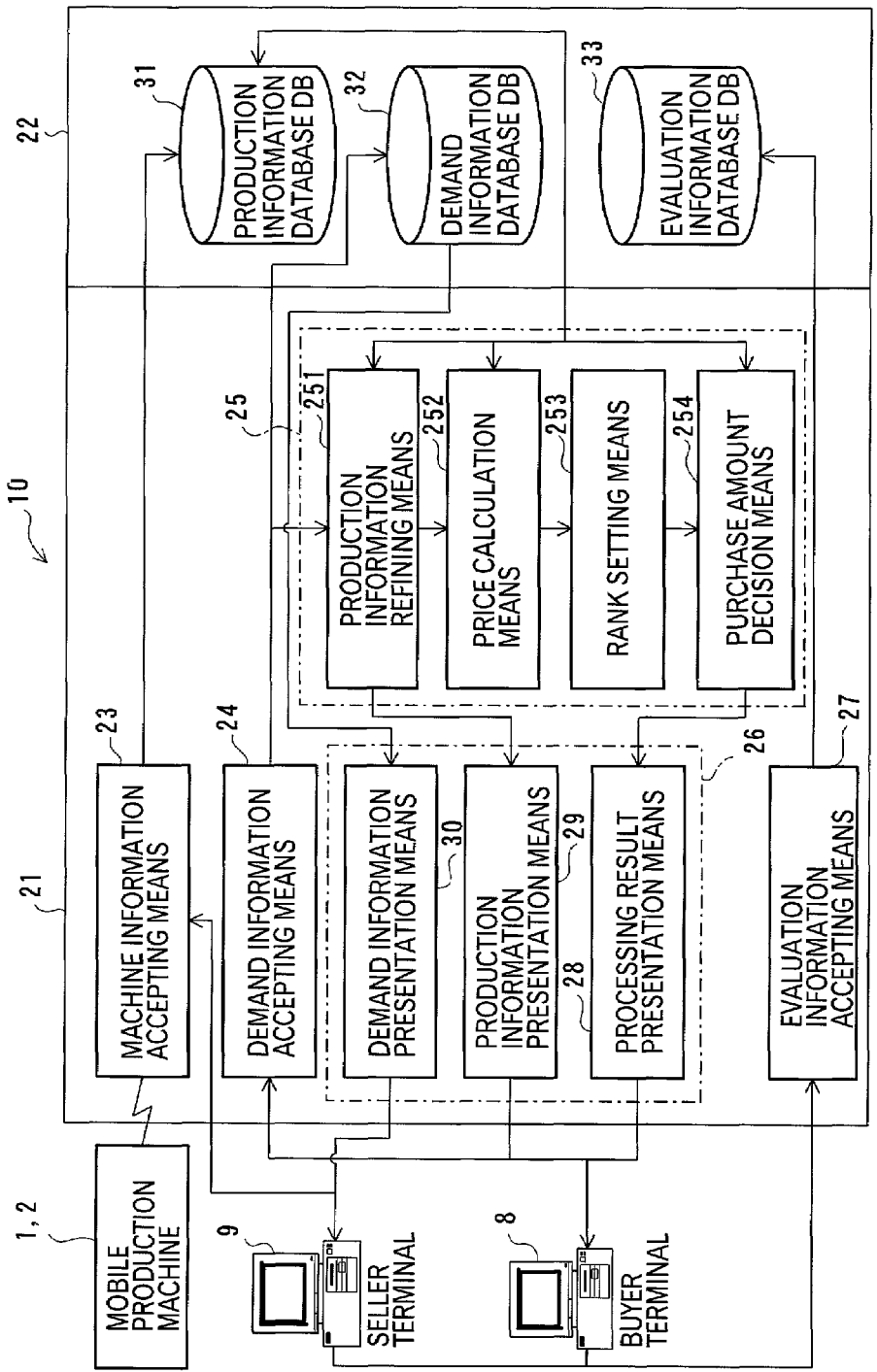
FIG. 3 is a block diagram that illustrates the configuration of the server as one of components that make up the system of the embodiment shown in FIG. 1.

The server 10 is constructed as a World Wide Web (WWW) server to be connected with the network 7. As shown in FIG. 3, the server 10 comprises the central processing unit 21 that executes various programs and the storage device 22 for storing the information in the hard disk or the like.

The central processing unit 21 comprises a machine information accepting means 23, the demand information accepting means 24, a matching processing means 25, a processing result presentation means 26, and a evaluation information accepting means 27, as programs to be executed on the operating system (OS) that controls the operation of the whole server including the processing unit 21. The information presentation means 26 comprises a processing result presentation means 28, a product information means 29, and a command a demand information presentation means 30.

The storage device 22 comprises: a production information database 31, a demand information database 32, and a evaluation information database 33 in addition to an area for storing programs including the OS and each of the above means 23 to 30.

The machine information accepting means 23 is a part for receiving machine information including the positional information and the operational information outputted from the communication terminal 14 of each of the mobile production machines 1, 2. Items and qualities of the products can be obtained from the model information included in the received machine information, while the amount of production of the products can be obtained from the operational information, followed by outputting to the production information database 31.

The machine information accepting means 23 can be accessed from the seller terminal 19 of the seller of products who manages each of the mobile production machines 1, 2, so that the seller may set the price or the like of the products to be produced in each of the mobile production machines 1, 2. In addition, the production information can be directly entered from the seller terminal 19, so that the future operational information of each of the mobile production machines 1, 2 which are not operated at the present can be inputted beforehand.

The demand information accepting means 24 is a part for receiving the demand information about the desired products to be purchased, the demand information of the buyer can be transmitted as it is from the buyer through the buyer terminal 18 and also outputted to a matching processing means 25.

The matching processing means 25 is a part for searching the production information accumulated in the production information database 31 on the basis of the demand information received at the demand information accepting means 24 and performing a matching processing in which the optimal information database is extracted in consideration of the freight cost. The matching processing means 25 comprises: a product information refining portion 251, a price calculation part 252, a rank setting part 253, and the purchase amount decision means 254.

The production information refining part 251 is a part which refines the production information which corresponds to a predetermined item as a fixed item among demand information, and the items, the quality, and the delivery time of choice of products are mentioned as a fixed item, for example.

That is, the production information refining part 251 matches the items and quality which the buyer demands, and only extracts the production information which can be delivered to the delivery time. Then, the buyer selects a seller in the production information being refined. Also, the production information refining part 251 can be also functioned as the production information extracting means for extracting life information to be illustrated in the production information presentation means 29.

The price calculating means 252 is a part for calculating the price including the freight cost of each production information to be information being refined using the production information narrow. The calculation of price is performed by separately calculating the price and the freight cost, followed by the addition thereof.

In general, the freight cost can be calculated by the distance between the positional information to be included in the product information and the delivery place of the products. Furthermore, it can be calculated by multiplying a freight cost per unit distance by multiplying the calculated distance with a freight cost per km.

The rank part 253 is a part for rearranging the production information refined in the production information refining on the basis of the price calculated in the price calculation part 252. Thus, it is rearranged so that the cheap production information containing freight cost may be located in a higher rank.

The purchase amount decision part 254 is a part for selecting one at the highest rank among the production information rearranged in the rank setting part 253 and deciding whether the quantity of production contained in the selected production information comprises the desired amount of purchase in the demand information.

If the quantity of production does not comprise the desired amount of purchase, then the purchase amount decision part 254 selects the production information on the following rank and the quantity of production in the selected production information is added on the quantity of production in the previously selected production information, followed by deciding whether the desired amount of purchase is included. The selection and the judgment can be repeated until the desired amount of purchase becomes included.

In addition, the production information refining part 251, the price calculation part 252, the rank setting part 253, and the purchase amount decision part 254 can be constituted as the corresponding programs using a language, such as SQL (Structured Query Language) used for a relational database management system.

The information presentation means 26 is a part that presents the various information being managed by the server 10 to the buyer terminal 18 and the seller terminal 19. More specifically, the processing result presentation means 28 presents the results of the matching processing performed with the matching processing means 25. The production information presentation means 29 presents the results of refined in the predetermined form by the production information refining part 251 used as a production information extraction means. Furthermore, the demand information presentation means 30 presents the desired information accumulated in the demand information database 32 in the predetermined form.

The evaluation information accepting means 27 is a part for accepting the other party's evaluation information outputted from the seller terminal 19 and/or the buyer terminal 18 after achieving the trading of products. The accepted evaluation information is then outputted to the evaluation information database 33.

The evaluation information database 31 is a part for accumulating the production information received by the above machine information accepting means 23. As shown in FIG. 4, the evaluation information database 31 is a table-structured database where the production information corresponding to the machine number of each of the mobile production machines 1, 2 is stored on one of its records. In the present embodiment, but not limited to, the production information to be stored includes seller's personal information, positional information, product items, product quality, production delivery time, the quantity of production, desired selling price, and so on.

The demand information database 32 is a part for accumulating the demand information received with the above demand information accepting means 24. As shown in FIG. 5, the demand information database 32 stores the demand information outputted from the buyer terminal 18 into one of records. In the present embodiment, but not limited to, the demand information includes the buyer's personal information, the desired purchase items, desired quality, desired delivery time, delivery place of the products, the desired amount of purchase, and so on.

The evaluation information database 33 is a part for accumulating the evaluation information received with the above evaluation information accepting means 27. As shown in FIG. 6, the evaluation information outputted from the buyer terminal 18 or the seller terminal 19 is stored in one of records. In the present embodiment, but not limited to, the evaluation information to be stored includes the information about information addresser, seller or buyer, trading partner, products to be dealt, product quality, and the amount of purchase, and evaluation information provided as the impression of the information addresser with respect to the results of the trading of such products.

The administrator of the server 10 checks periodically the evaluation information accumulated in the evaluation information database 33, and takes the measure in which participation of the products trading system is forbidden, to the seller or buyer having a remarkably worse evaluation.

[System Operation]

Next, the operation of the product trading system configured as described above will be explained in detail along flow charts of FIGS. 7, 8, and 10, respectively. In the following description, by the way, the outputs of machine information from the mobile production machines 1, 2, and the accumulation of product information, the matching processing in response to the output of demand information from the buyer terminal 18, and the evaluation and the accumulation after achieving the tradings are processed in the server 10, individually. Thus, they will be described on an individual basis.

(I) Accumulation of Product Information

Figure 7:
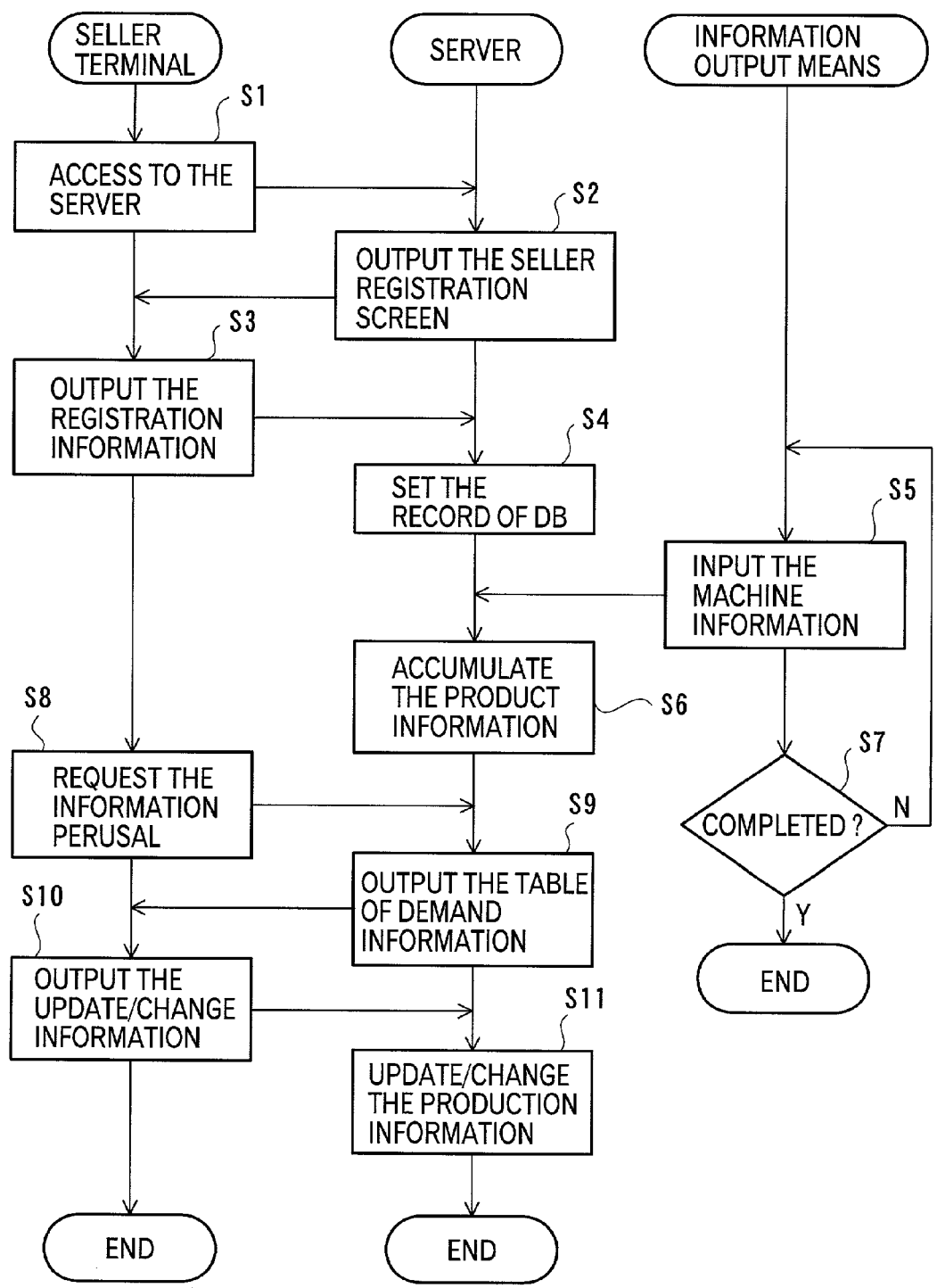
FIG. 7 is a flow chart that illustrates the movement of the system of the embodiment shown in FIG. 1.

The accumulation of product information can be carried out along the steps in a flow chart shown in FIG. 7.

First, the seller who would like to participate in the product trading system makes an access to the server 10 by entering the server's URL (Uniform Resource Locator) into a browser software on the seller terminal 19 (Step S1).

Then, the machine information accepting means 23 equipped in the server 10 makes a judgment whether the request of access from the seller terminal 9 is from a first-time seller or not. If it is from a new seller, then a seller registration form is displayed on the screen of a display device on the seller terminal 19 (Step S2).

The seller makes entries into the seller registration form under instructions displayed on the screen of the seller terminal 19 and then sends the seller registration information to the server 10 (Step S3). The seller registration information may include the name of seller's company, ID and password for access permission, the machine numbers of the respective mobile production machines 1, 2 managed by the seller, product items and qualities to be produced from each machine, and so on. As described above, furthermore, other mobile production machines in rest at the present may be allowed to receive inputs of information such as the quantity of production from the seller terminal 19 on the basis of the future construction plan or the like.

The machine information accepting means 23 having the registration information received from the seller terminal 19 sets a record on the production information database 31 for each of machine numbers (machine Nos.) of the corresponding mobile production machines 1, 2 on the basis of the registration information 25 (Step S4), followed by entering the items and qualities of the products to be produced from each machine are entered.

In addition, not shown in FIG. 7, the machine information accepting means 23 generates a request to the network control station 6. The request is for urging the network control station 6 to output the machine information generated from the mobile production machines 1, 2 that correspond to the machine Nos. registered in the record to the server 10 for preparing the acceptance of such machine information.

The communication controller 12 is provided as one of components that make up the machine information output means of each of the mobile production machines 1, 2 to be installed on a construction site or the like. The communication controller 12 generates both the operational information obtained from the electronic controller 11 and the present positional information obtained from the GPS sensor 13 as machine information in wireless communication (Step S5).

The machine information accepting means 23 receives the machine information inputted through the communication satellite 4, the satellite earth station 5, and the network control station 6 and calculate the quantity of production of the products by each of the mobile production machines 1, 2 from the operational information contained in such machine information, while specifying the present locations of the respective mobile production machines 1, 2 on the basis of the positional information contained in the machine information, followed by storing such production information into the production information database 31 (Step S6: the procedure for accumulating the production information).

Furthermore, the output of machine information from the machine information output means of each of the mobile production machines 1, 2 is periodically generated until the production of products is completed while completing the construction at the construction site. If the operation conditions of each mobile production machine 1, 2 at the construction site is changed, then the information stored in the production information database 31 will be updated one by one in response to the changes (Step S7).

Thus, in the state of having come to accumulate periodically the production information about the products produced from each of the mobile production machines 1, 2 which are being self-managed by the seller, when a seller performs production control or the like, the seller requests perusal of the demand information accumulated in the demand information database from the seller terminal 19 at first (Step S8). In addition, since what is necessary is just to be able to acquire the demand information about products produced by the mobile production machines 1, 2 being managed by the seller, then the seller performs rifining of the items of products down.

To the perusal request from the seller, the demand information presentation means 30 searches for the corresponding demand information from the demand information database 32, and outputs the list of the corresponding demand information to the seller terminal 9 (Step S9: demand information presentation procedure).

The seller who received the list of demand information outputs updating/change information to the server 10 from the seller terminal 9 while directing control of the production quality of products, or the quantity of production to the mobile production machines 1, 2 under management, based on quality information, the desired amount of purchase of choice, and so on, which are contained in the products in the demand information (Step S10).

The machine information accepting means 23 by which updating/change information was received updates and registers the contents of the production information on the corresponding numbered machine of the production information database 31 (Step S11).

Thus, since the seller who participated in the system can bring the mobile production machines 1, 2 being managed by the seller into operation to produce products with their items and qualities depending on the demand information by looking up the demand information accumulated at the demand information database 32, facilitating the trading between the seller and the buyer.

(2) Matching Processing on Demand Information

Figure 8:
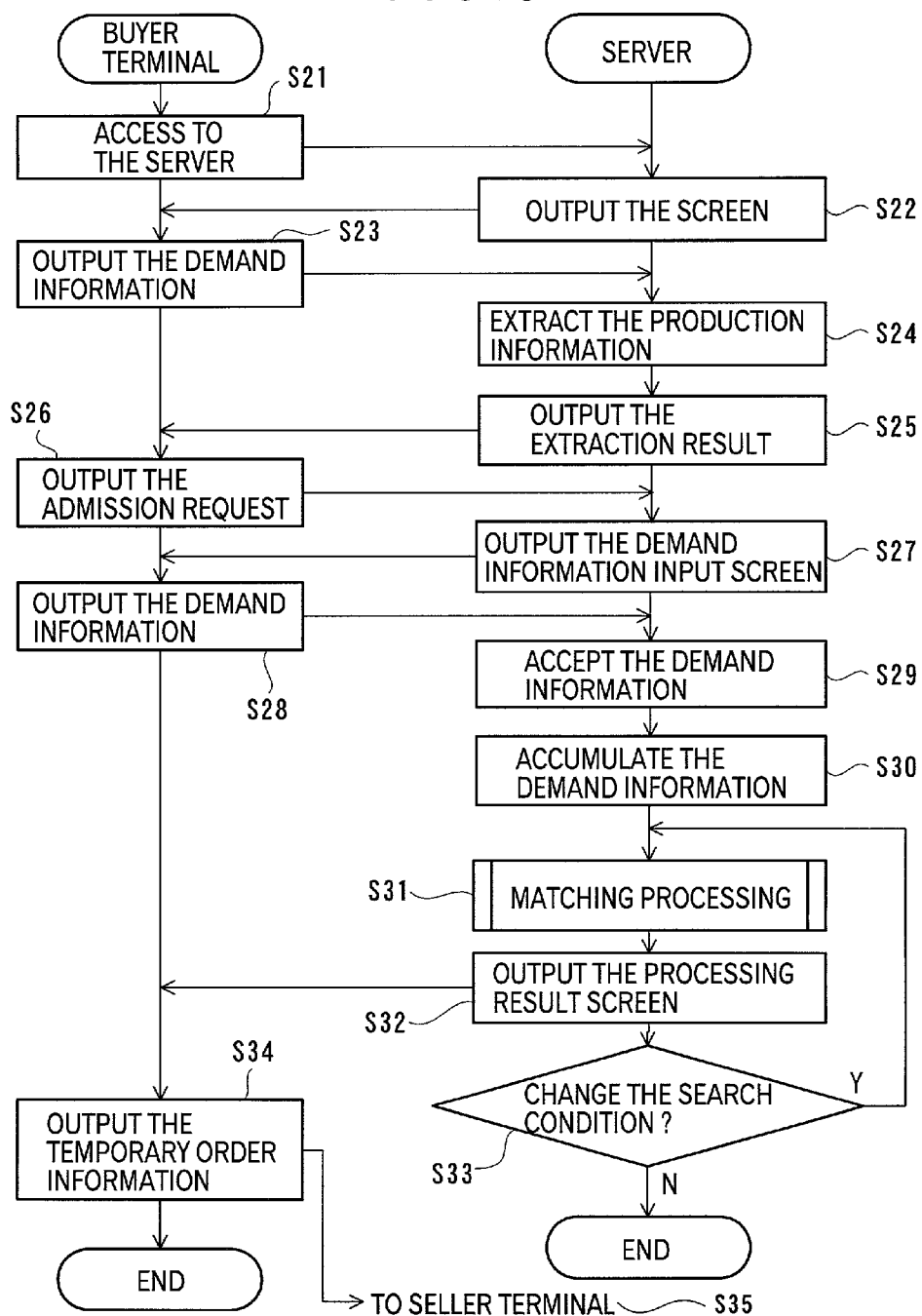
FIG. 8 is a flow chart that illustrates the movement of the system of the embodiment shown in FIG. 1.
Figure 10:
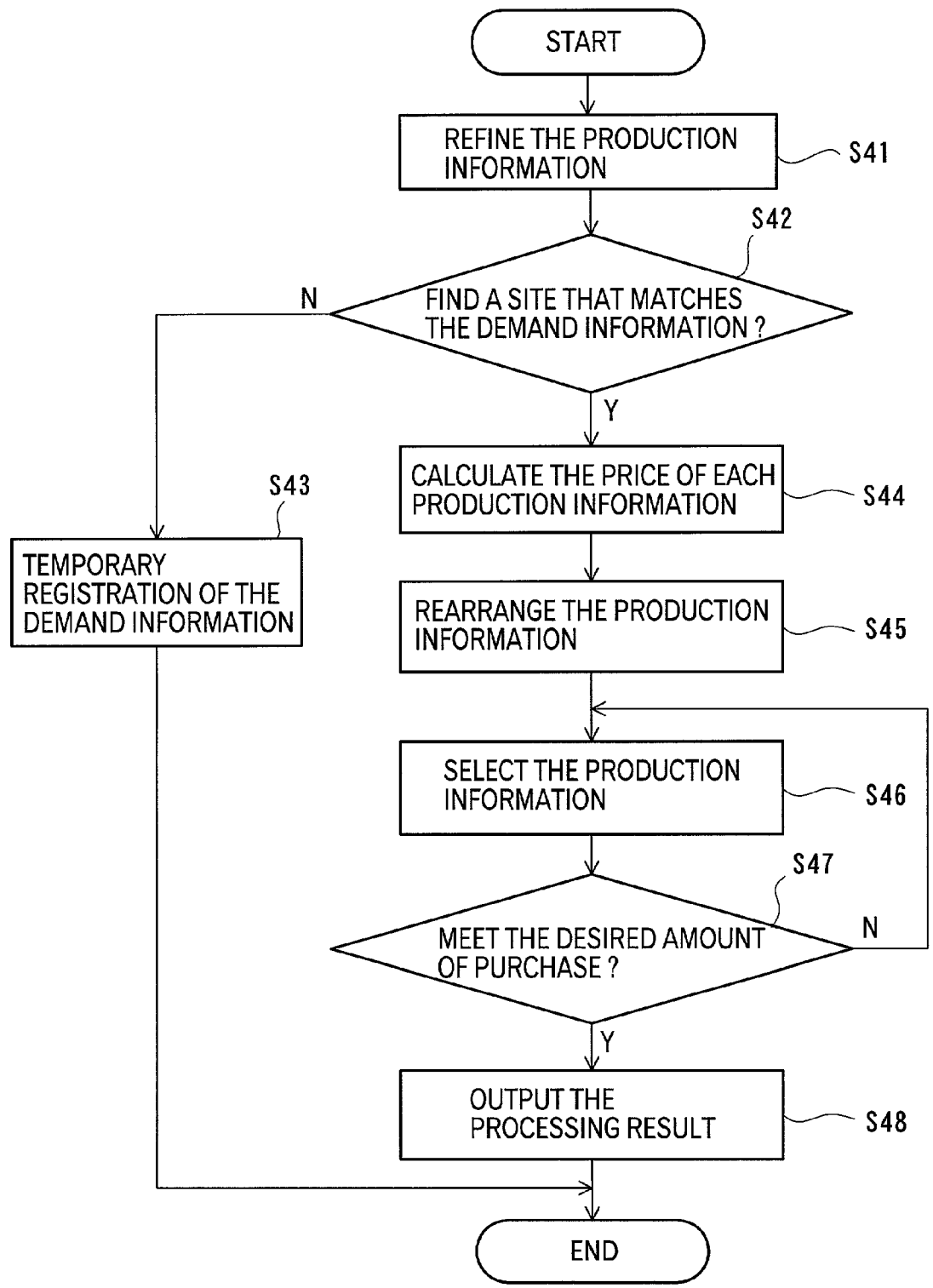
FIG. 10 is a flow chart that illustrates the steps of the matching processing using the matching processing means in the embodiment shown in FIG. 1.
Figure 11:
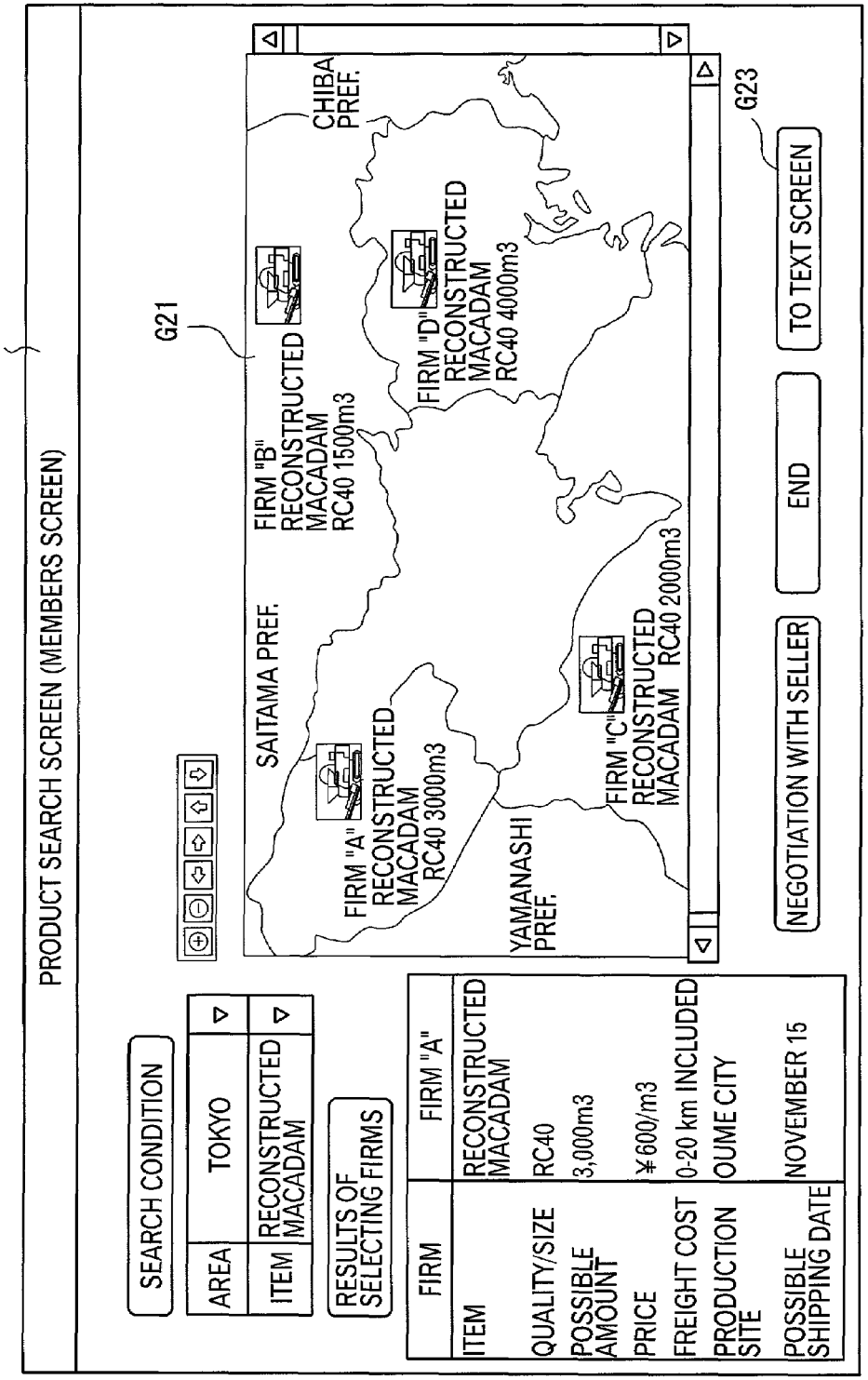
FIG. 11 is a schematic diagram that illustrates a display screen represented by the matching processing result presentation means in the embodiment shown in FIG. 1.

The matching processing is carried out on the demand information along the steps in flow charts shown in FIG. 8 and FIG. 10.

First, the buyer who would like to purchase the products accesses the server 10 using the buyer terminal 18 (Step S21).

Figure 9:
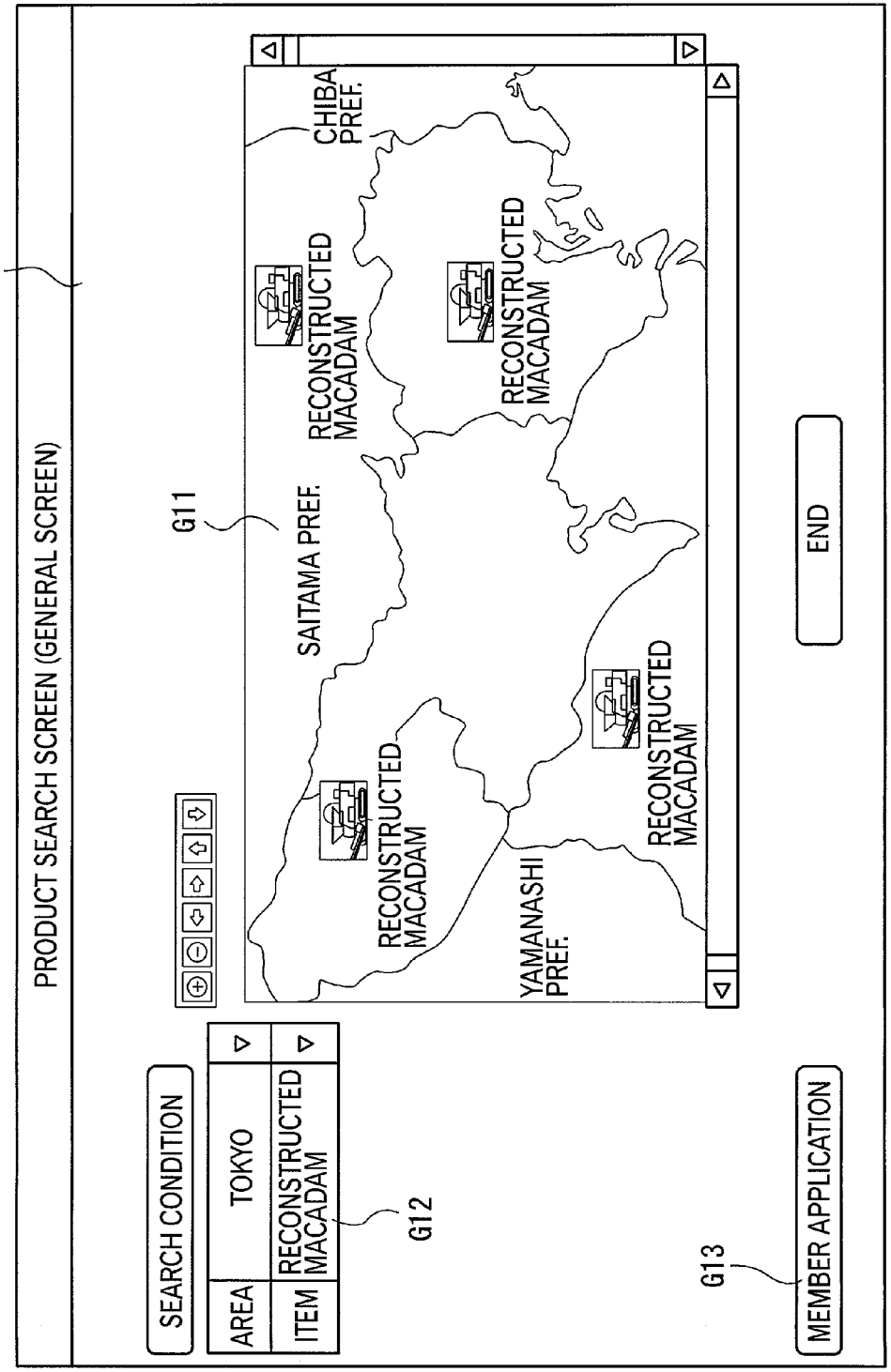
FIG. 9 is a schematic diagram that illustrates a display screen represented by the production information presentation means in the embodiment shown in FIG. 1.

If the access demand from the buyer terminal 8 is received by the demand information accepting means 24, the production information presentation means 29 will output a screen G1 shown in FIG. 9 to the buyer terminal 8 (Step S22). This screen G1 is comprised of a map view G11 on which map information is displayed, a combo-box G12 for refining the scope of search, and the member application button G13.

If the combo-box G12 is operated by the buyer using the buyer terminal 18 to specify the display area of the map view G11 and the desired product items to be purchased, then the buyer terminal 18 outputs them as demand information to the demand information accepting means 24 (Step S23: demand information accepting procedure).

The outputted demand information is inputted into the production information refining part 251 through the demand information receptionist means 24. Then, the production information refining part 251 extracts the production information, by which the products are produced in the specified display areas on the screen with respect to the product items included in the demand information, from the product information database 31 (Step S24). Subsequently, the results are outputted to the production information presentation means 29.

The production information presentation means 29 invokes map information corresponding to the specified display areas from the map information database (not shown in FIG. 3) stored in the storage device 22. Then, the production information presentation means 29 outputs a screen G1 to the seller terminal 8 after placing the production places of specified items on the almost corresponding areas on the map information called on the screen on the basis of the positional information included in the extracted production information (Step S25).

Thereby, the buyer who checked the screen G1 is able to find a designated area where the desired products to be purchased are present. Therefore, the production spot of the products of the neighborhood can be pinpointed based on the displayed production information. Then, the buyer negotiates with the seller directly and can receive products at the optimal cost from the optimal seller who does not require freight cost. When the buyer wants for more detailed information to come to hand, the member application button G13 of the screen G1 is clicked with a mouse or the like. The information about the 15 buyer's admission registration application is outputted to the demand information accepting means 24 from buyer terminal 8 (Step S26). Subsequently, the demand information accepting means 24 outputs the screen to which the input of information required for registration of the buyer and the demand information concerning more detailed products is urged to the buyer terminal 8 (Step S27).

Based on the screen displayed on the buyer terminal 8, the buyer inputs registration information and demand information, followed by transmitting output from the buyer terminal 8 (Step S28). This information is received by the demand information accepting means 24 (Step S29: demand information accepting procedure). In addition, the items of desired products to be purchased, their qualities, the amount of purchase, delivery time, delivery place of the products, and so on are contained in more detailed demand information.

The demand information accepting means 24 stores the accepted demand information from the buyer into the demand information database 32 (Step S30), and then outputs the demand information to the matching processing means 25. The matching processing means 25 initiates the matching process in accordance with the demand information (Step S31).

The matching processing is carried out along the steps in a flow chart shown in FIG. 10.

First, the product information refining part 251 refines the scope of the corresponding product information accumulated in the production information database 31 on the basis of product items, qualities, the desired delivery time, and so on in the demand information (Step S41: product information refining procedure).

Therefore, the scope of production information can be refined as described above, so that the buyer can be aimed only at required information even when the seller manages the mobile production machines 1, 2 that produce the different products using the product trading system.

As a result of refining, the product information refining portion 251 decides whether there is production information that matches to demand information (Step S42). If there is no production information that matches to demand information, the flag of temporary registration is given to the predetermined field of the record with which it corresponds in the demand information database 32 (Step S43), followed by completing the matching processing.

When some production information is extracted, the production information refining part 251 outputs the result of refining to the price calculation part 252. Then, the price calculation part 252 calculates the price including freight cost for each production information (Step S44: price calculation step). Furthermore, as described above, the calculation of price is performed as follows. First, the product price is calculated on the basis of unit price presented by the seller and the quantity of production, while a transportation distance is calculated with reference to the positional information of mobile production machines 1, 2 and the delivery place of the products. Then, the transportation distance is multiplied by a transportation unit price (e.g., a charge per km of one track) and then added to the product price.

If the price calculation of each production information by price calculation part 252 is completed, based on the prices of the products containing transportation-charges, a rank setting part 253 will rearrange production information in increasing order of price (Step S45: rank setting step).

The purchase amount decision part 254 selects the cheapest production information on a price, and decides whether the quantity of production of the selected production information meets the desired amount of purchase in the demand information (Steps S46 and S47: the steps for deciding the amount of purchase).

If it is decided that the quantity of production in the selected production information does not fill the desired amount of purchase, then the purchase amount decision part 254 selects the next cheapest production information and repeats the steps S46 and S47 until the quantity of production in the selected production information fills the desired amount of purchase.

If the combination of production information with which the selected amount of purchase is filled is attained, the purchase amount decision part 254 will output the results to the processing result presentation means 28 (Step S48), followed by completing the matching processing.

Returning now to FIG. 8, the processing result presentation means 28 generates a screen G2 with respect to the results of matching processing. Then, the screen G2 is outputted to the buyer terminal 8 (Step 32: processing result presentation procedure).

The screen G2 indicates low-priced product information obtained from the matching processing results as positional representation. If the seller cricks a production information position on the map view G21, the details concerned about such cricked production information is displayed on an information display view G22 on the left side of the screen.

Moreover, in the screen G2, when the buyer clicks with a mouse or the like on a button G23 of "go to text screen", as shown in FIG. 12, the screen G3 having a list table G31 of production information is displayed. Thus, the list of the production information refined in the production information refining part 251 can be checked, and the production information chosen by the matching processing is specified by the check on the left side of the table.

In this screen G3, if the buyer changes the combo-box which constitutes the search condition G32 at the upper part of the screen G3 and changes delivery time, quantity, and so on (Step S33), a matching processing by the matching processing means will be performed again, and a new search result will be displayed on the table G31.

If the buyer who checked the screen G3 decides to purchase the products as a result of matching processing, the temporary order button G33 on the screen G3 will be clicked with a mouse or the like to output the temporary order information (Step S34).

The temporary order information outputted from the buyer terminal 18 is once received by the demand information accepting means. Then, the information about the request of purchase and the buyer is outputted to the seller terminal of the seller corresponding to the selected information (S35).

Henceforth, negotiation about direct trading is performed between the seller and the buyer, and then their concrete trading begins.

Thus, by performing the matching processing within the server, the buyer is allowed to select the desired products from the production information accumulated in the production information database 31 and purchase the products at optimal price.

Moreover, the machine information outputted from the mobile production machine 1, 2 are outputted automatically, and accumulated in the product information database 31. Therefore, the seller does not need to separately perform any promotion to the buyer or the like and thus the products can be efficiently sold.

(3) Evaluations After Achieving the Trading

Figure 13:
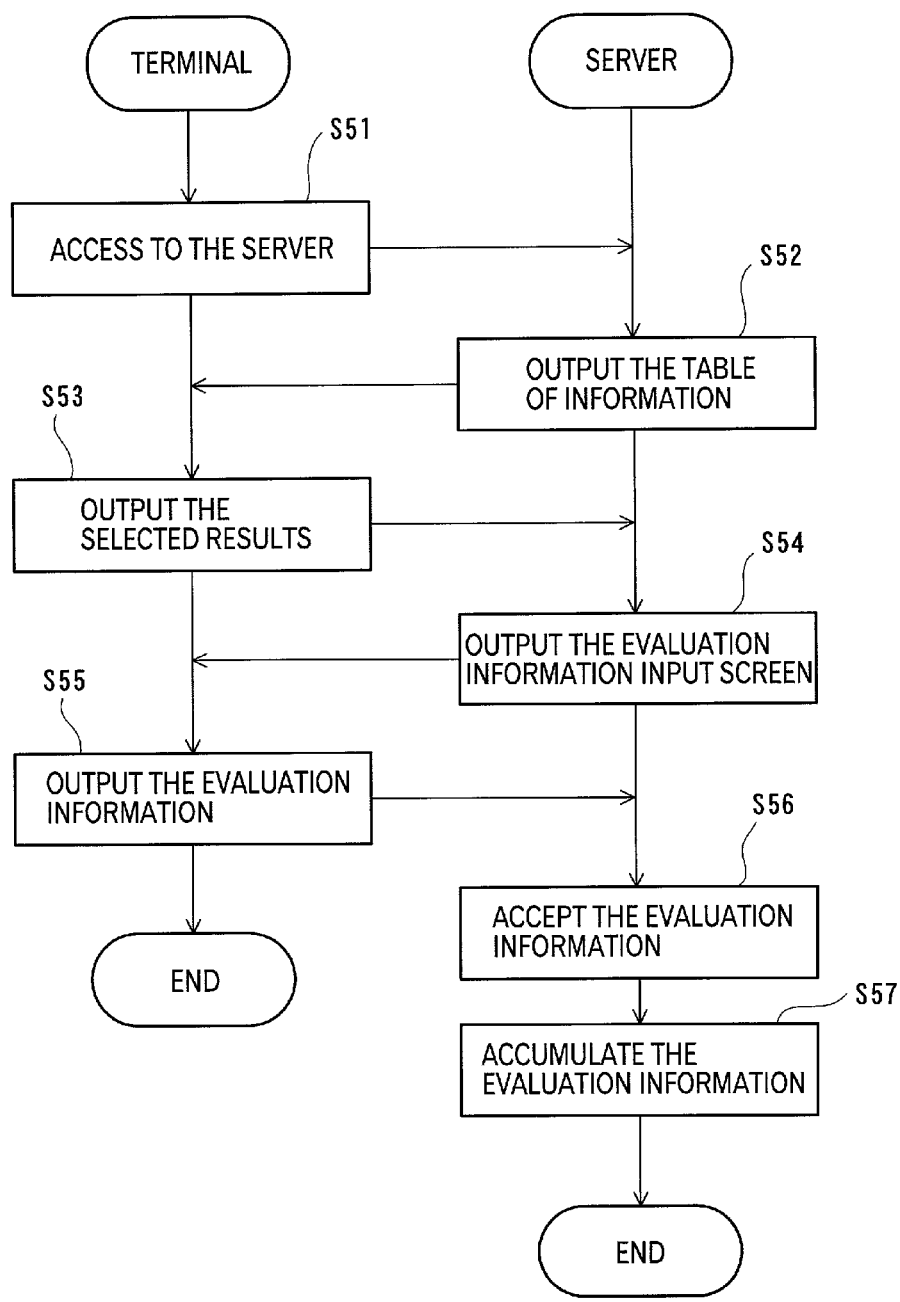
FIG. 13 is a flow chart that illustrates the movement of the system of the embodiment shown in FIG. 1.

If each of the seller and the buyer performs the evaluations on the trading of the products when the actual trading of products are completed between them, it can be carried out based on a flow chart shown in FIG. 13.

For outputting the evaluation information concerned about the partner of trading, the seller or the buyer accesses the server 10 (Step S51). Then, the server 10 outputs a production information list of the seller or a demand information list of the buyer (Step S52). If the seller or the buyer outputs the selection results of the production information concerned about the corresponding trading, or demand information to the server 10 (Step S53), this selection results will be received with the evaluation information accepting means 27.

The evaluation information accepting means 27 outputs the screen for the evaluation information input for inputting the evaluation information to the seller terminal 9 or the buyer terminal 8 (Step S54). Based on the input screen displayed on the display of the seller terminal 9 or the buyer terminal 8, the seller or the buyer inputs evaluation information and then outputs to the server 10 (Step S55). This evaluation information is received by the evaluation information accepting means 27 (Step S56: evaluation information accepting procedure).

The accepted evaluation information is accumulated in the evaluation information database 33 (Step S57: evaluation information accumulating procedure).

The administrator of the server 10 peruses the evaluation information accumulated periodically at the evaluation information database 33. If the other evaluation decides that the buyer or the seller is not suitable one to be participate in trading in the present system, then the registration of such a person is erased to prevent he or her participation in the present system.

Accordingly, the present system can be always managed without troubles, so that the sense of reliabilities of the buyer or seller who participates can be increased. As a result, the number of persons to be registered in the present system can be increased.

MODIFIED EMBODIMENTS

The present invention is not limited to the embodiment described above. It is also possible to modify the above embodiment as follows.

In the above embodiment, the machine information outputted from the mobile production machines 1, 2 is received by the machine information accepting means 23. However, the present invention is not limited to such a configuration of the system. It is also possible to design the system so that the seller may output the production information directly from the seller terminal. Alternatively, the machine information from each of the mobile production machines 1, 2 may be received by the seller terminal and then the results being collected by the seller may be outputted as the production information.

In the above embodiment, all of the means 23 to 30 are designed so as to be in the server 10. However, the present invention is not limited to such a configuration of the system. It is also possible that the seller terminal and/or the buyer terminal may take over part of the functions from the accepting means 23, 24, 27 and/or the presentation means 28, 29, 30.

Furthermore, therefore, such a modification may reduce the burdens on the server, so that communications between the server and each terminal can be performed with simple information such as numerical data, resulting in improved communication responsibility.

In the above embodiment, furthermore, the product trading system is of producing reusable products by the mobile production machines 1, 2 installed on a road construction side or a demolition construction site. However, the present invention is not limited to such a usage pattern of the system. It is also possible to use the present system in the case of the trading with a production factory that produces products in usual. That is, the present invention can be just adopted when the freight cost of products poses a problem to the prices of products.

Furthermore, it will be understood by persons skilled in the art that the concrete structures, forms, and so on for carrying out the present invention will be any of those within the scope and spirit of the present invention.

What is claimed is:

1. A product trading system for achieving a deal between a seller who sells a product and a buyer who purchases the product, comprising:
   a plurality of production machines located at different sites, the respective production machines including machine information generating means for monitoring the production machine, generating production information related to a product being produced or to be produced by the production machine and outputting the production information, and including location information generating means for generating location information specifying a location of the production machine and outputting the location information;
   an accumulation means for accumulating the production information related to the product being produced or to be produced and the location information from the production machines at respective sites;
   a demand information accepting means for accepting demand information with respect to a product that the buyer would like to purchase;
   a matching processing means for performing a matching processing that derives optimal production information from the production information accumulated in the accumulation means based on the demand information accepted at the demand information accepting means, the optimal production information being determined based on the location information for the plurality of production machines; and
   a matching processing result presentation means for presenting the buyer with the processing results from the matching processing means.

2. A product trading system according to claim 1, wherein the product information includes items, quality, quantity of production, unit price, shipping time, and production place of the product to be produced, and the demand information includes items, quality, amount of purchase, delivery time, and delivery place of the product with which the buyer would like to purchase, and the matching processing means comprises:

a production information refining part that considers items, quality, and delivery time of the product included in the demand information as fixed items and refines the production information that suits the fixed items;

a price calculation part for computing a price that contains freight cost;

a rank setting part for setting up the rank of each production information in increasing order of price on the base of prices calculated in the price calculation part; and a purchase amount decision part for selecting the production information in increasing order of price on the basis of the rank set up in the rank setting part and deciding whether the amount of purchase of the product in the selected information meets the amount of purchase in the demand information.

3. A product trading system according to claim 1, further comprising:

a demand information accumulating means for accumulating demand information being accepted by the demand information accepting means; and a demand information presentation means for showing the seller the demand information being accumulated in the demand information accumulating means.

4. A product trading system according to claim 1, further comprising:

an evaluation information accepting means for receiving the information about evaluations made by the trading partner, which is provided from the seller and/or the buyer after attaining a deal between the seller and the buyer; and an evaluation information accumulating means for accumulating evaluation information received by the evaluation information accepting means.

5. A product trading system according to claim 1, further comprising:

a client/server system having a seller terminal, a buyer terminal, and a server connected together on a network, wherein the production information accumulating means, the demand information accepting means, a matching processing means, and the matching processing result presentation means are placed in the server.

6. A product trading system for achieving a deal between a seller who sells a product and a buyer who purchases the product, comprising:

a mobile production machine to produce the product sold by the seller, the mobile production machine including a machine information output means for generating an output of machine information that includes items of the product produced by the machine, positional information about the machine, and operational information;

a production information accumulating means for accumulating production information about the product based on the machine information outputted from the machine information output means;

a demand information accepting means for accepting demand information about the product which the buyer would like to purchase;

a production information extracting means for extracting the machine information being accumulated in the production information accumulating means based on the demand information being accepted by the demand information accepting means; and a production information presentation means for showing the buyer a mobile production machine located in a neighborhood of a delivery place included in the demand information based on the positional information output by the machine information output means.

7. A product trading system according to claim 6, further comprising:

a matching processing means for performing a matching processing in consideration of freight cost to induce optimal information from the accumulated production information on the basis of the demand information, wherein the product information presentation means is constructed so that the results of the matching processing can be displayed.

8. A product trading system according to claim 7, wherein the demand information includes items, quality, amount of purchase, delivery time, and delivery place of the product with which the buyer would like to purchase, and the matching processing means comprises:

a production information refining part that considers items, quality, and delivery time of the product included in the demand information as fixed items and refines the production information that suits the fixed items;

a price calculation part for computing a price that contains freight cost;

a rank setting part for setting up the rank of each production information in increasing order of price on the base of prices calculated in the price calculation part; and a purchase amount decision part for selecting the production information in increasing order of price on the basis of the rank set up in the rank setting part and deciding whether the amount of purchase of the product in the selected information fills the amount of purchase in the demand information.

9. A product trading system according to claim 6, further comprising:

a demand information accumulating means for accumulating demand information being accepted by the demand information accepting means; and a demand information presentation means for showing the seller the demand information being accumulated in the demand information accumulating means.

10. A product trading system according to claim 6, further comprising:

an evaluation information accepting means for receiving the information about evaluations made by the trading partner, which is provided from the seller and/or the buyer after attaining a deal between the seller and the buyer; and an evaluation information accumulating means for accumulating evaluation information received by the evaluation information accepting means.

11. A product trading system according to claim 6, further comprising:

a client/server system having a seller terminal, a buyer terminal, and a server connected together on a network, wherein the production information accumulating means, the demand information accepting means, a matching processing means, and the matching processing result presentation means are placed in the server.

12. A product trading method for achieving a deal between a seller who sells a product and a buyer who purchases the product, comprising:

monitoring a plurality of production machines located at different sites, the monitoring including generating production information related to a product being produced or to be produced by the respective production machines and outputting the production information, and generating location information specifying respective locations of the production machines and outputting the location information;

accumulating the production information related to the product being produced or to be produced from now on by the seller and the location information from the production machines at respective sites;

accepting demand information with respect to a product that the buyer would like to purchase;

performing a matching processing that derives optimal production information from the accumulated production information based on the accepted demand information, the optimal production information being determined based on the location information for the plurality of production machines; and a matching processing result presentation procedure for presenting the buyer with the processing results from the matching processing procedure.

13. A product trading method according to claim 12, wherein the product information includes items, quality, quantity of production, unit price, shipping time, and production place of the product to be produced, and the demand information includes items, quality, amount of purchase, delivery time, and delivery place of the product with which the buyer would like to purchase, and the matching processing procedure comprises:

a production information refining step that considers items, quality, and delivery time of the product included in the demand information as fixed items and refines the production information that suits the fixed items;

a price calculation step for computing a price that contains freight cost;

a rank setting step for setting up the rank of each production information in increasing order of price on the base of prices calculated in the price calculation step; and a purchase amount decision step for selecting the production information in increasing order of price on the basis of the rank set up in the rank setting step and deciding whether the amount of purchase of the product in the selected information fills the amount of purchase in the demand information.

14. A product trading method according to claim 12, further comprising:

a demand information accumulating procedure for accumulating demand information being accepted by the demand information accepting procedure; and a demand information presentation procedure for showing the seller the demand information being accumulated in the demand information accumulating procedure.

15. A product trading method according to claim 12, further comprising:

an evaluation information accepting procedure for receiving the information about evaluations made by the trading partner, which is provided from the seller and/or the buyer after attaining a deal between the seller and the buyer; and an evaluation information accumulating procedure for accumulating evaluation information received by the evaluation information accepting procedure.

16. A computer readable recording medium wherein a computer program for executing a product trading method according to claim 12 is stored.

* * * * *